United States Patent [19]

Lane et al.

[11] Patent Number: 4,846,053

[45] Date of Patent: Jul. 11, 1989

[54] APPARATUS FOR MAKING A MOLASSES-BASED ANIMAL FEED MASS

[75] Inventors: Larry G. Lane, Willard; Raymond L. Orwig, Armstong, both of Mo.

[73] Assignee: R & J Orwig, Inc., Armstrong, Mo.

[21] Appl. No.: 44,361

[22] Filed: Jun. 11, 1987

Related U.S. Application Data

[62] Division of Ser. No. 797,255, Nov. 12, 1985, Pat. No. 4,737,377.

[51] Int. Cl.⁴ .............................................. A23K 1/02
[52] U.S. Cl. ....................................... 99/339; 99/348; 99/483; 99/485; 99/517; 366/107; 366/144; 366/320; 366/603
[58] Field of Search .................. 99/348, 339, 516, 517, 99/534, 357, 426, 483, 484, 485, 496, 487, 470, 472, 152, 160; 366/101, 144, 107, 145, 603, 320, 177, 182, 154–156; 426/487, 635, 658

[56] References Cited

U.S. PATENT DOCUMENTS

| | | | |
|---|---|---|---|
| 1,498,084 | 6/1924 | Finney | 366/107 X |
| 2,634,907 | 4/1953 | Smith | 426/487 |
| 3,932,736 | 1/1976 | Zarow et al. | 99/487 X |
| 4,011,806 | 3/1977 | Kimura | 99/485 |
| 4,491,420 | 1/1985 | Addison | 366/603 |
| 4,534,283 | 8/1985 | Nakamuta | 99/483 |

Primary Examiner—Timothy F. Simone
Attorney, Agent, or Firm—Laubscher, Preston & Laubscher

[57] ABSTRACT

A method of, and apparatus for making hard, dense, vitreous molasses-based animal feed supplement masses, the method comprising heating a molasses composition to a temperature within the range of about 240° F. to about 285° F. to remove all of the water content of the molasses that is necessary to form the desired vitreous masses. A portion of the heating process may be accompanied by an injection of ambient air into the molasses composition being heated. Immediately after heating, the molasses composition is cooled, agitated and de-aerated by directing the molasses composition through a cooler and de-aerator including a conduit in which is positioned an offset beater shaft assembly adapted to separate portions of the composition from the remainder thereof while directing cooling air through the conduit about said portions. After cooling, other animal feed supplements may be mixed with the molasses composition by a utilization of a variable pitch ribbon mixer-auger, further cooled, containerized, and allowed to cure into hard, dense, vitreous masses.

24 Claims, 7 Drawing Sheets

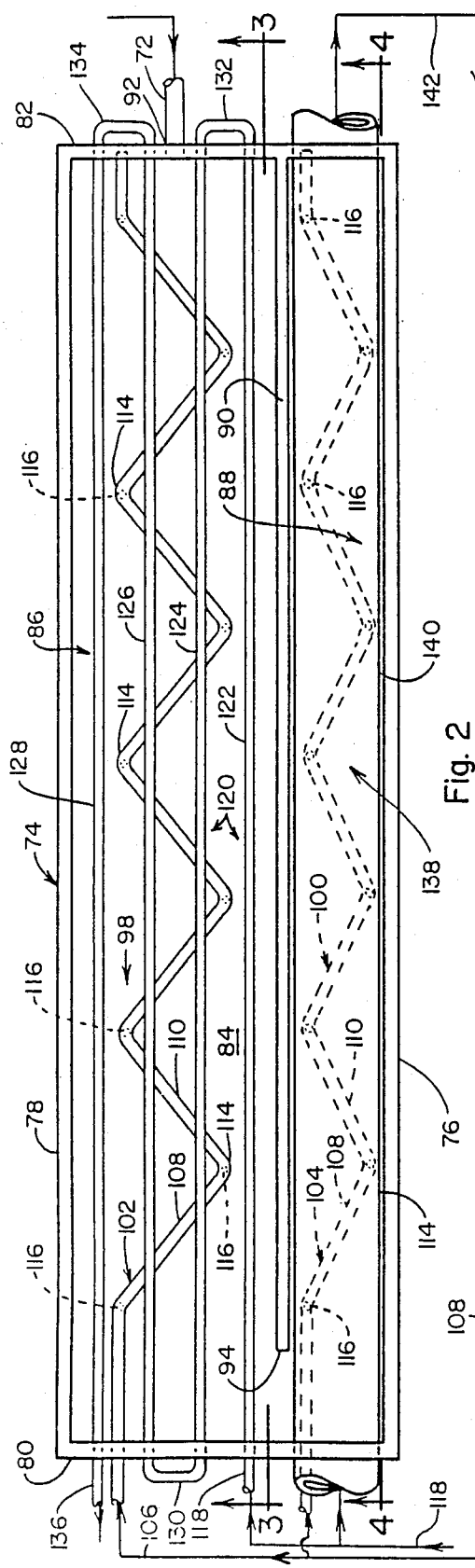
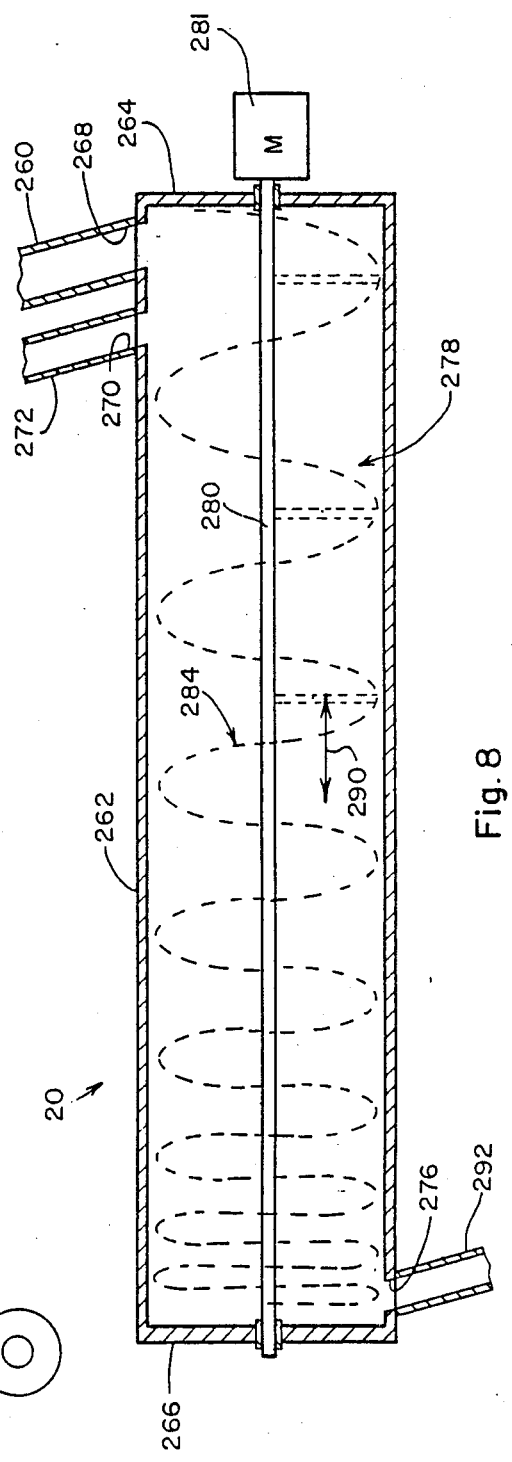

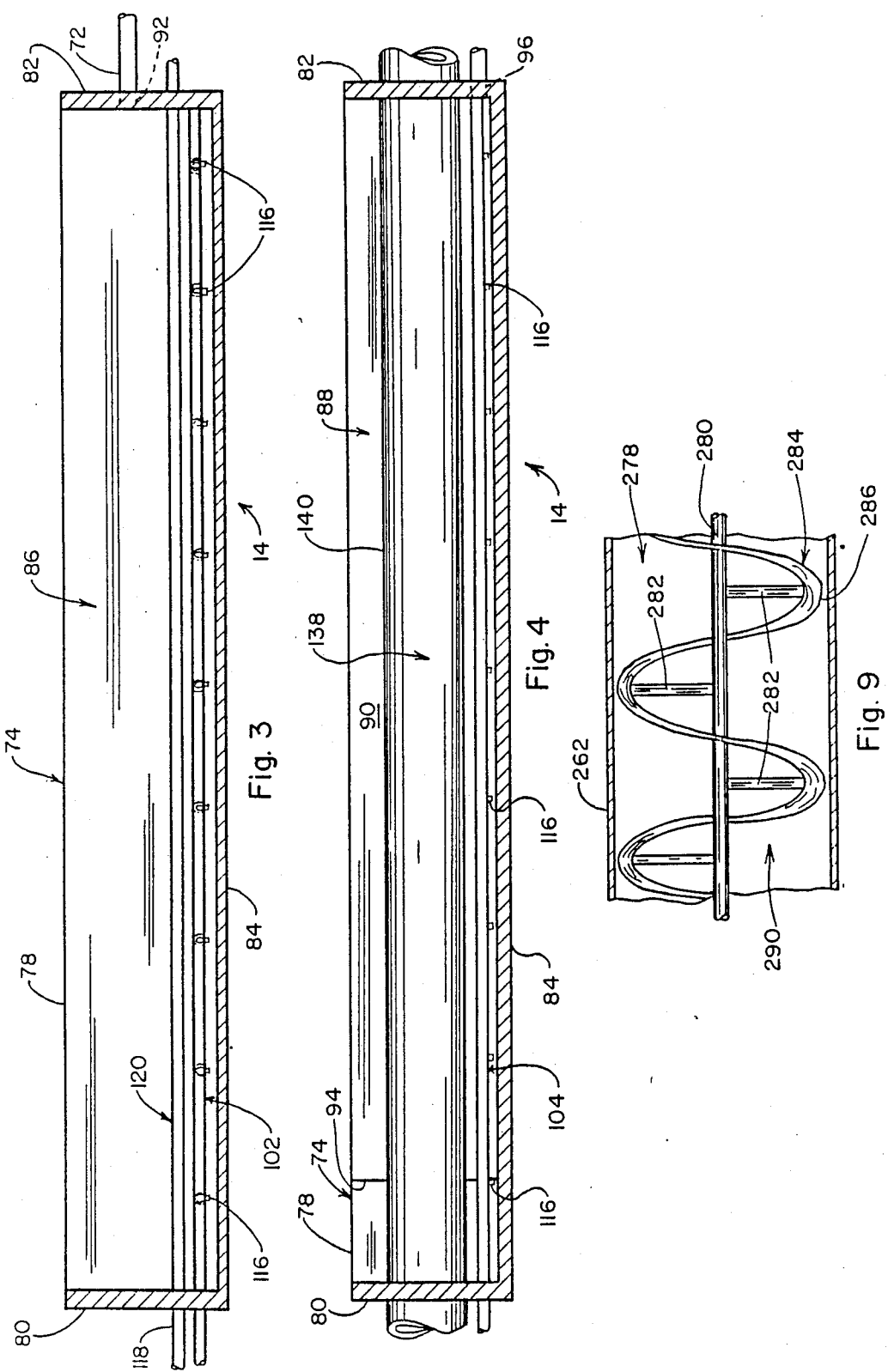

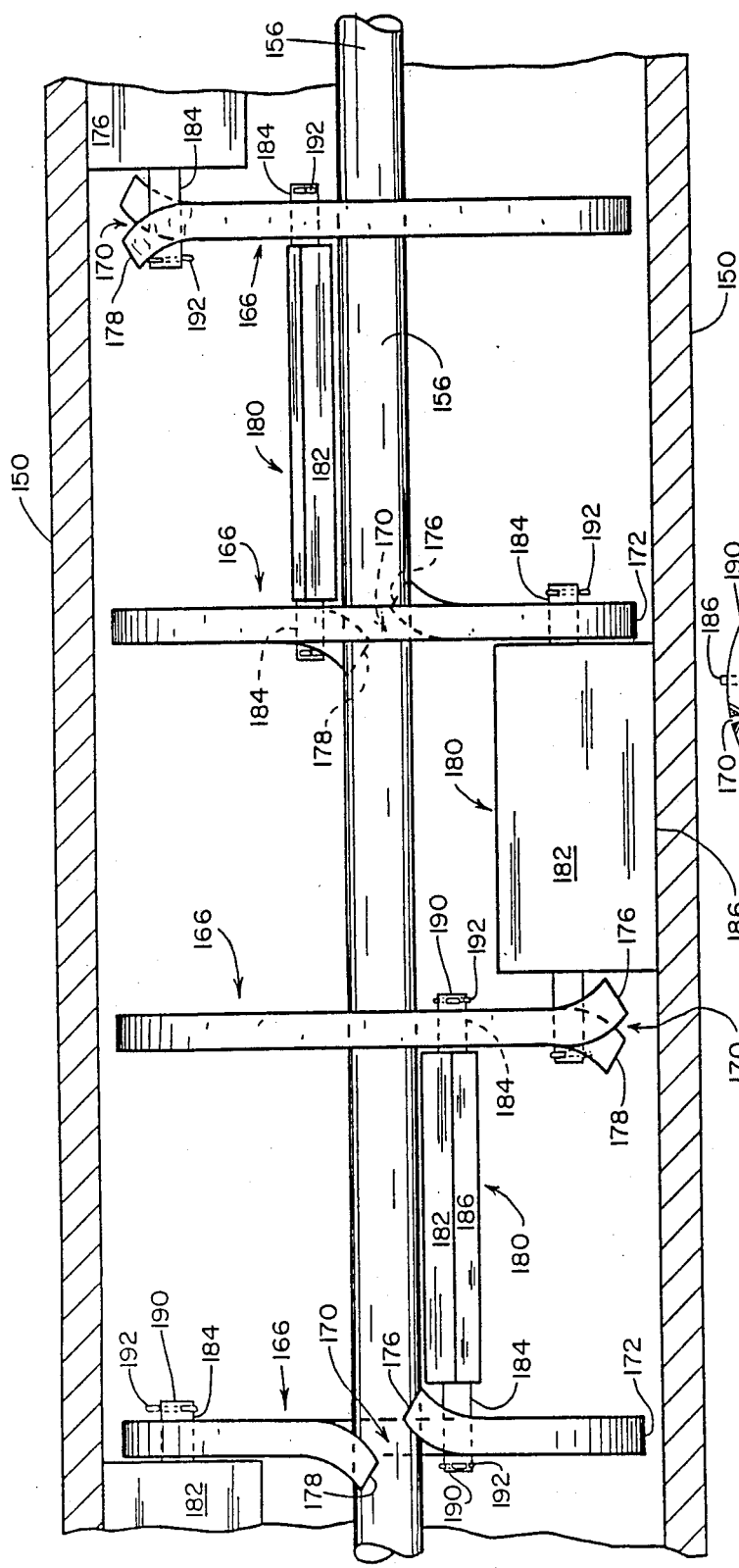
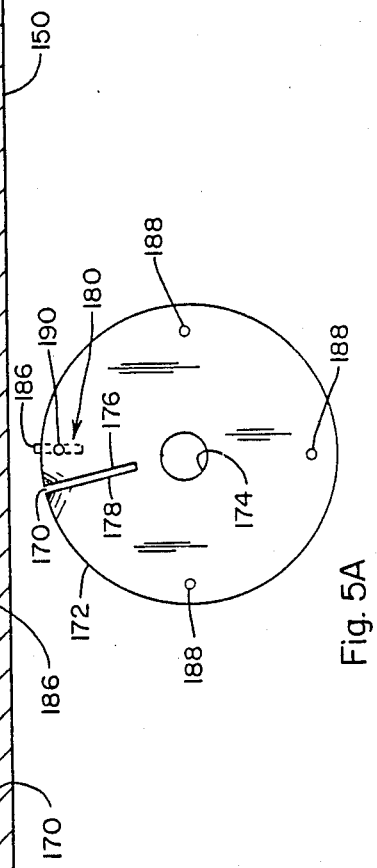
Fig. 5A
Fig. 5B

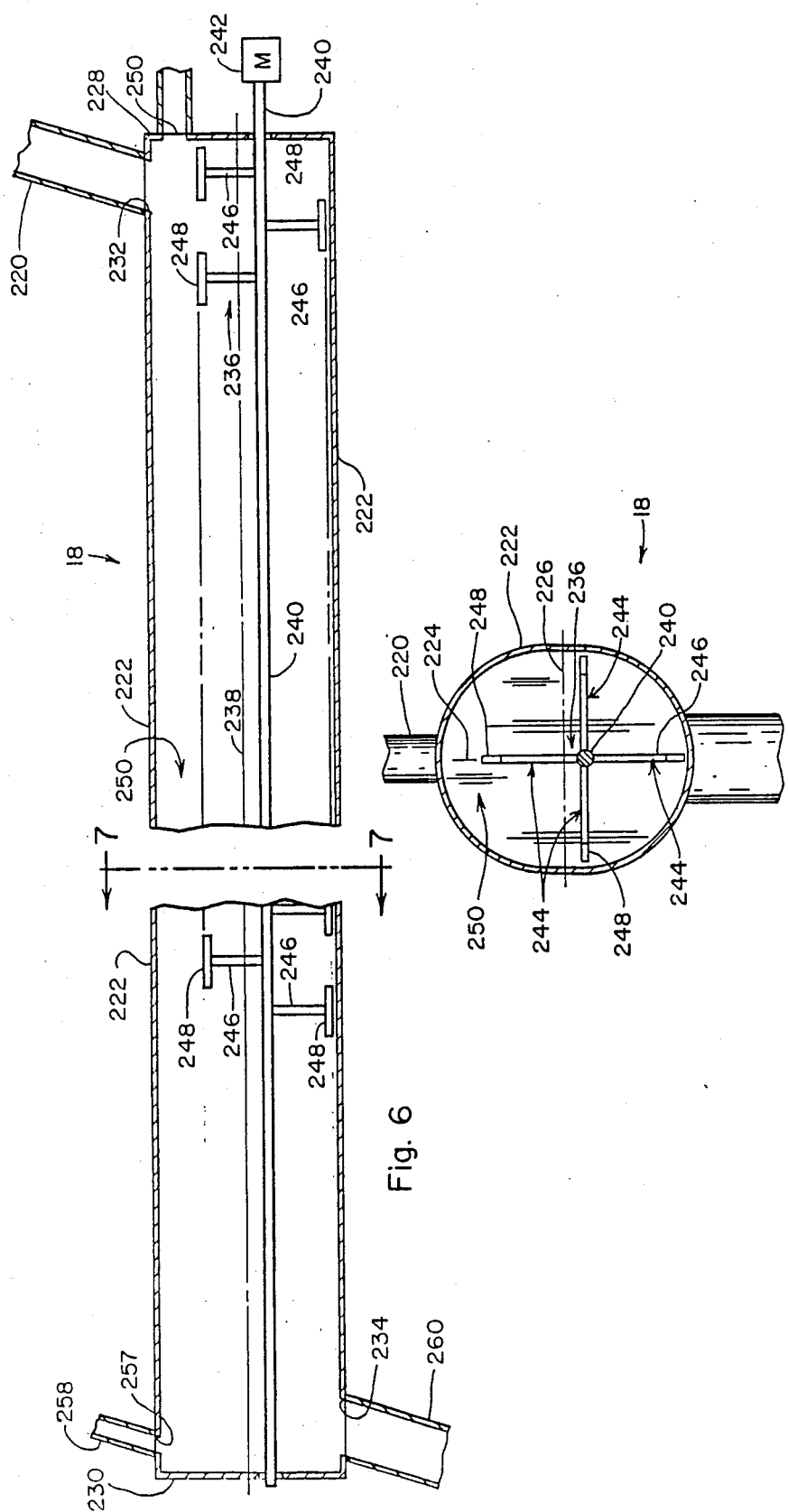

APPARATUS FOR MAKING A MOLASSES-BASED ANIMAL FEED MASS

This application is a division of application Ser. No. 797,255, filed Nov. 12, 1985, U.S. Pat. No. 4,737,377.

This invention relates to methods of and apparatus for making a molasses-based animal feed supplement mass of the type heretofore called a block wherein molasses may be mixed with other animal feed supplements and formed into a dense, non-porous, vitreous mass.

BACKGROUND OF THE INVENTION

Heretofore high energy feed supplements have been used extensively for cattle, hogs, sheep and the like, such supplements conventionally being in particulate or liquid forms and comprising fat, urea, vitamins minerals, pharmaceuticals and the like. More recently, such supplements have been available mixed with molasses and formed into a hard, dense, non-porous, vitreous mass, sometimes termed, or mistermed, a "block". In the latter regard, the term "block" is presently thought to be inappropriate because it implies a solid, and such "blocks" do not exhibit all the characteristics of conventional solids. Although it is true that a properly formed block of such feed supplement will shatter like glass when struck, such blocks exhibit other characteristics that are not like conventional solids. For example, if a solid object of any substantial weight is placed on the top of even a properly formed non-porous vitreous block, in a relatively short period of time, the object will sink completely into, and be encased by, the block without any apparent softening of the block. In this light, and in light of other similar examples indicating block material flowage, such blocks might more appropriately be called extremely viscous fluids, or alternately called hydroscopic gels transiently in a crystaline form. Nevertheless, for consistency with the prior art and economy of description, the term "block" will sometimes be used herein.

Hard, dense, non-porous vitreous molasses-based animal feed supplement blocks have met with substantial commercial acceptance because such blocks are convenient to handle as compared to particulate or liquid forms of feed supplement. Additionally and importantly, these blocks are especially convenient to feed by virtue of the hygroscopic characteristic of molasses blocks whereby only the surface of a properly formed block is softened from a glass-like state to an edible condition upon continued exposure to moist air. Because of this characteristic, the contents of such blocks become only incrementally available as feed, at a predictable rate, thereby inhibiting over feeding.

A method of making such molasses-based animal feed supplement vitreous blocks is disclosed in the U.S. Pat. No. 3,961,081 to McKenzie wherein it is presented that to form dense molasses blocks, the water content of the molasses has to be reduced to less than 5%. The McKenzie method basically comprises a preliminary step of heating a composition of molasses mixed with other animal feed supplements to a temperature within the range of 225° F. to 300° F. to partially reduce the water content of the molasses so that the remainder thereof is 5% or greater. Since molasses of the type utilized by McKenzie is normally comprised of about 20% to 25% water content, such water content reduction amounts to removal of not more than 75% to 80% of the molasses water content. Of particular significance is the fact that McKenzie discloses the requirement that after heating, the composition is then subjected to a substantial vacuum to further substantially reduce the remaining water content of the molasses to about 3% prior to forming the composition into blocks. After formation the blocks are allowed to cool and cure at ambient conditions until hardened into a dense vitreous form. While this McKenzie patent method has met with some success in forming vitreous molasses blocks, it is important that during the heating stage of this method, care must be taken to avoid development of hot spots in the composition, as well as to avoid any substantial expansion and foaming. Such hot spots are considered undesirable because they may damage or burn the molasses or other more heat-sensitive additives thereby lowering the quality of the resultant product. Substantial expansion, which may occur to the extent of as much as 600%, and foaming are considered undesirable because such interferes with the physical handling of the molasses during processing, reduces production, and, unless controlled, also reduces the density of the resulting blocks. Reduced block density results in premature and internal block softening. Additionally, the McKenzie method requires machinery for the practice thereof, particularly the application of vacuum to the composition to dehydrate the same, that is relatively complicated, extensive and energy intensive and production from such machinery is not as great as might be desired.

SUMMARY OF THE INVENTION

The present invention overcomes these and other disadvantages and shortcomings of the prior art and is embodied in a method of and apparatus for making a hard, dense, vitreous molasses-based animal feed supplement block or mass, the method comprising heating a molasses composition to a temperature within the range of about 240° F. to about 285° F. to remove all of the water content of the molasses that is to be removed therefrom, and immediately rapidly cooling, agitating and de-aerating the compositon at ambient pressure to reduce the temperature of the composition to at least 200° F. and to remove air entrained therein that might otherwise effect block density. The composition may then be mixed with other supplements, further cooled, placed into open containers, and allowed to cool to ambient temperature and cure to an extremely hard, non-porous, dense, vitreous mass. It has been found that heating to remove all the water that is to be removed and then rapid cooling and de-aerating the molasses obviates any necessity, as alleged by McKenzie, for the application of vacuum to remove the final increments of water from the composition, all such undesirable water content having been removed during the heating step of the instant method. Elimination of the need for any vacuum processing to remove water content provides substantial economies in energy conservation and machinery cost and increases production therefrom without adversely affecting the quality of the resultant product.

To better avoid hot spots developing in the molasses during the heating-evaporation process that may damage the composition, to assist and accelerate the evaporation process by breaking the surface tension of the molasses, and to avoid undesirable extreme expansion and foaming of the composition, the present invention further provides for injecting ambient air into the composition throughout a substantial portion of the heating-water removal process while the molasses is still in a relatively thick condition. Such expansion and foaming have been found to be undesirable not only because it interferes with the mechanics of the heating process but also because it results in less dense final product. Blocks that are not sufficiently dense more quickly and more deeply absorb water, quickly becoming a sticky glob inconvenient to handle and impossible to feed at a controlled rate. However, it has been found that by injecting air at a multiplicity of locations evenly dispersed throughout the initial heating-evaporation step, the resulting product is substantially more dense. It is believed that the injected air not only agitates and circulates the molasses being heated to avoid development of hot spot therein but also breaks the surface tension of the still thickened molasses thereby facilitating water removal by evaporation by inducing the passage of steam from the molasses into the atmosphere in an open tank wherein this initial heating-evaporation step is performed instead of permitting such steam to well-up under the surface of the thickened molasses.

After sufficient cooking to remove by evaporation all of the water content that is to be removed (which may be a reduction of the water content of the molasses to less than 5%) it is an important aspect of the present invention that the molasses composition is then rapidly cooled and de-aerated. This is achieved according to the present invention by utilization of an flail tube through which a substantial volume of cooling air is directed while the molasses composition is beaten, stretched, tossed, thrown about and conveyed through the flail tube having an offset shaft frail therein. Such extensive flailing action is important not only because it aids in rapidly cooling the composition but also because it de-aerates the same resulting in a more dense final product.

It is therefore a principal object of the present invention to provide a method of, and apparatus for making a molasses-based animal feed supplement block or mass that avoids the disadvantages and shortcomings of the prior art.

More specifically, it is a principal object of the present invention to provide a method of, and apparatus for making a molasses-based animal feed supplement mass that is particularly and especially hard, dense, non-porous and vitreous in form.

It is another object of this invention to provide such a method by utilization of a molasses storage tank heater, a pre-heater, a heater-cooker-aerator, a final cooker, a flail cooler-de-aerator and a mixer-auger avoiding the shortcomings of the prior art structures.

It is a further object of the present invention to provide a method of, and apparatus for making a molasses-based animal feed supplement vitreous mass wherein means are provided to reduce or break the surface tension of the molasses while it is being heated to aid in the passage of steam therefrom.

It is a further object of the present invention to provide a method of, and apparatus for making a molasses-based animal feed supplement vitreous mass wherein air is injected into and dispersed throughout the molasses as it is initially cooked to evaporate the water content therefrom.

It is a further object of the present invention to provide a method of, and apparatus for making a molasses-based animal feed supplement vitreous mass wherein, after removal of all the water content thereof necessary for proper mass formation, the composition is rapidly cooled and de-aerated.

It is a further object of the present invention to provide a method of, and apparatus for making a molasses-based animal feed supplement vitreous mass wherein molasses in relatively pure form is heated to remove all of the water content thereof necessary to properly form a vitreous mass, the molasses is then cooled, and subsequently, other feed supplements are added and mixed with the molasses in an efficient manner prior to forming a vitreous mass to thereby avoid any heat damage to such other supplements.

It is another object of the present invention to provide a particularly efficient and effective means for mixing molasses and other feed supplements, or the like.

It is a further object of the present invention to provide a method of, and apparatus for making a molasses-based animal feed supplement vitreous mass by cooking the molasses wherein any requirement is avoided for an application of a vacuum to the molasses composition to reduqe the water content thereof, or for any other purpose.

It is a further object of tne present invention to provide a method of, and apparatus for making a molasses-based animal feed supplement vitreous mass wherein the apparatus therefor is relatively simple and inexpensive, is energy efficient, and production therefrom is enhanced.

These and other objects and advantages of the present invention will become apparent after considering the following detailed specification of a preferred embodiment of the present invention in conjunction with the accompanying drawings forming a part of the disclosure hereof wherein:

FIG. 2 is a plan view of a simplified form of a cooker-aerator utilized in the method diagramed in FIG. 1;

FIG. 3 is a cross sectional view of the cooker-aerator shown in FIG. 2 and taken along lines 3—3 therein;

FIG. 4 is another cross sectional view of the cooker-aerator shown in FIG. 2 but taken along lines 4—4 therein;

FIG. 5A is a side view of one disk utilized in the final cooker-evaporator shown in FIG. 5;

FIG. 5B is an enlarged fragmentary schematic cross sectional view of a portion of the final cooker-evaporator shown in FIG. 5;

FIG. 6 is a schematic fragmentary cross sectional view of a flail cooler and de-aerator utilized in the method diagramed in FIG. 1;

FIG. 7 is a cross-sectional view of the flail cooler and de-aerator shown in FIG. 6 taken along line 7—7 therein;

FIG. 8 is a schematic cross sectional view of a mixer-auger utilized in the method diagramed in FIG. 1; and FIG. 9 is a fragmentary cross sectional view of a portion of the mixer-auger shown n FIG. 8.

DETAILED DESCRIPTION OF A PREFERRED EMBODIMENT

Figure 1:
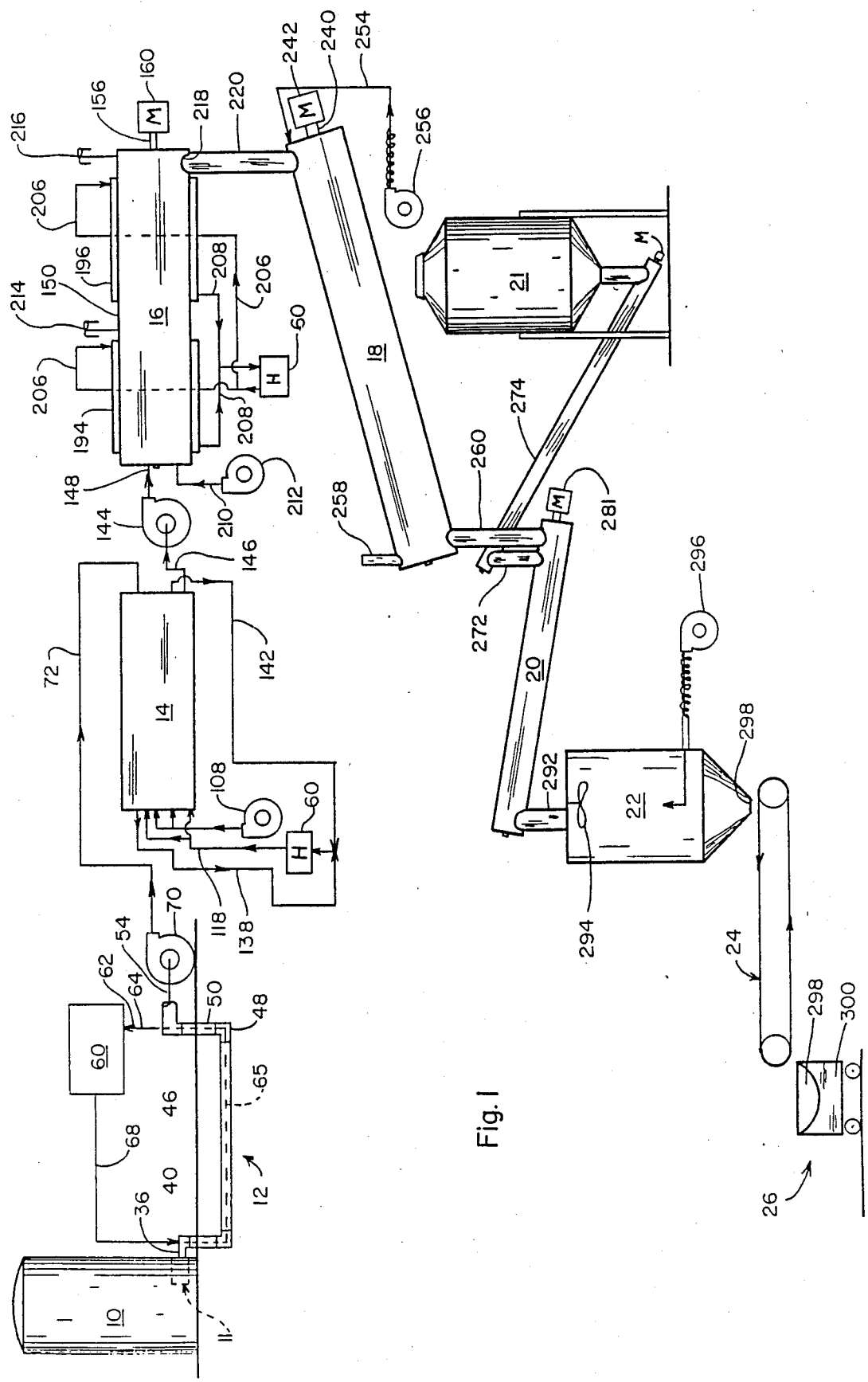
FIG. 1 is a schematic diagram of apparatus for the practice of a method of making a molasses-based animal feed supplement mass according to the present invention diagramatically illustrating the machinery therefor.

Referring in more detail to FIG. 1 of the drawings there is schematically and diagramatically illustrated therein apparatus for the practice of a method of making a molasses-based animal feed supplement block or mass wherein the resultant product is hard, dense, non-porous and vitreous. The method basically comprises tapping liquid molasses from a remote storage tank 10 through a tank outlet heater 11 wherein the cold, thick molasses at the outlet is heated to about 80° F., so it will more readily flow out of the storage tank 10. The molasses is directed, preferably underground, through a preheater 12 wherein the molasses is heated to approximately 140° F. to further thin the same. The somewhat thinned molasses is directed to a plant or building 13 (FIG. 1A) and pumped through an initial heater-cooker and aerator 14 wherein the molasses is heated and cooked to approximately 240° F. to remove by evaporation a substantial portion of the water content thereof and air is injected therein for purposes that subsequently will be more fully discussed. The molasses is then pumped through a final heater-cooker 16 wherein the molasses is heated and cooked from a temperature of about 240° F. to between about 260° F. to 285° F. to remove most of the remaining water content thereof and all of the water content that it is necessary to remove to form the desired vitreous mass. The molasses is then moved by gravity through a flail-cooler and de-aerator assembly 18 wherein the molasses is rapidly cooled to a temperature of between about 180° F.-200° F. and forcefully agitated and thrown about to remove air entrained therein. The molasses then falls by gravity into a mixer-auger 20 preferably having a variable pitch abbreviated screw wherein dry feed supplements from a hopper 21, such as plant protein, roughage, fat, urea, vitamins, salt, other minerals, and/or pharmaceuticals or the like are mixed with the molasses and conveyed to a cooling tower 22. The temperature of the mixed composition may be further reduced in the cooling tower 22 or otherwise to preferably between about 140° F.-150° F. and not more than 170° F. and the resultant product conveyed by a conveyor 24 to a containerizing station 26 wherein the composition is containerized in any desired size and weight. The composition is then permitted to cool to ambient temperature and cure to thereby form a hard, dense, non-porous vitreous mass. Of particular significance ro the present invention is the manner in which the liquid molasses is cooked to remove the water content thereof without the application of a vacuum thereto and rapidly cooled and de-aerated prior to the addition and mixing of other feed supplements.

Figure 1A:
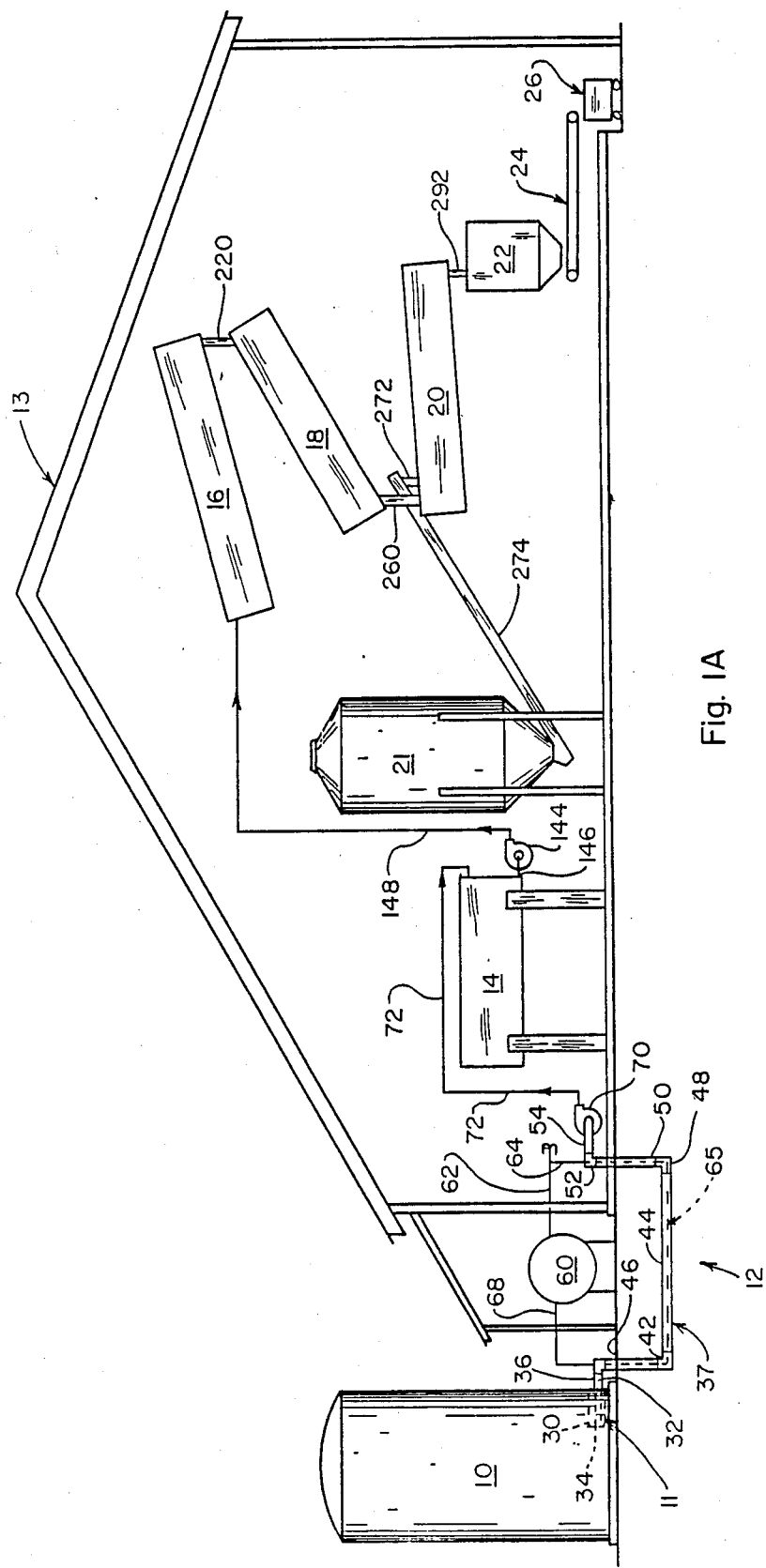
FIG. 1A is a schematic elevational view of the machinery diagramed in FIG. 1 shown as such machinery might be located in a plant housing the same.

Referring in more detail to FIG. 1 of the drawings, liquid molasses of any normally employed type, such as sugar cane molasses, having any normally encountered specific gravity for raw molasses, such as a Brix number of from 80 to 100, flows by gravity from the storage tank 10 through the tank outlet heater 11. No attempt is made to heat the entire molasses content of the storage tank 10 but rather the gravity flow therefrom is heated only as needed. Referring to FIG. 1A of the drawings, the tank outlet heater 11 may be of any conventional construction, such as an electric heater coil 30 positioned inside the tank 10 about the tank outlet conduit 32, an inner end 34 of which projects through the heater coil 30 and is adapted to receive gravity flow of molasses from the tank 10. An outer end 36 of the tank outlet conduit 32, which may typically be a pipe of about 3 inches in diameter, is connected to the preheater 12. The preheated 12 is typically formed of a pipe 3 inches in diameter and comprises an outer conduit assembly 37 including a first vertical outer conduit 38 connected at its upper end at a right angle by an elbow 40 to the outer end 36 of the outlet conduit 32. The lower end of the vertical outer conduit 38 is connected by a right angle elbow 42 to the left end of a horizontal outer conduit 44 positioned below the surface of the ground 46 by a distance of about 2 feet. The other end of the horizontal outer conduit 44 is connected by a right angle elbow 48 to the lower end of a second vertical outer conduit 50, the upper end of which is connected by a right angle elbow 52 to a main molasses supply conduit 54 the other end of which is connected to the initial heater-cooker and aerator 14. To heat the molasses to about 140° prior to passage into the heater-cooker and aerator 14, a heat source or steam generator or boiler assembly 60 is provided. The steam boiler 60 includes a steam outlet conduit 62 connected by a heat exchange medium delivery conduit 64, to an inner conduit assembly 65 positioned inside of the outer conduit assembly 37 of the preheater 12. The heat exchange delivery conduit 64 is typically a ¾ inch diameter pipe and is connected to a like-sized pipe forming the inner conduit assembly 65. The inner conduit assembly 65 is directed through and sealed within the elbows 52, 48, 42 and 40, and the first and second vertical and horizontal outer conduits 50, 38 and 44 of the outer conduit assembly 37, and is connected to a steam return conduit 68 connected to the boiler 60. The preheater 12 is adapted to receive molasses in the space between an inner and outer periphery of the outer and inner conduit assemblies 37 and 65 to heat molasses passing therethrough to about 140° F. Because a majority of the length of the preheater 12 is preferably buried beneath the ground surface 46 and insulated by the surrounding ground, the heating efficiency thereof is enhanced. A pump 70 is connected on one side thereof to the main molasses supply conduit 54 and on the other side to a supply conduit 72 to direct molasses to the initial heater-cooker and aerator 14.

Referring to FIGS. 2–4, the initial heater-cooker and aerator 14 according to the present invention comprises a stainless steel tank or receptacle 74 typically approximately two feet wide by ten feet long and three feet deep. The tank 74 comprises front and rear side walls 76 and 78 respectively connected together by left and right end walls 80 and 82 respectively, and a bottom wall 84. The tank is divided into a large capacity first section 86, and a smaller capacity second section 88 by a center partition 90. A molasses inlet opening 92 is provided in the first section 86 intermediate the right end wall 82, the inlet opening 92 being connected to the conduit 72. The center partition 90 extends from the right hand end wall 82 to a point spaced from the left hand end wall 80 to form a passage or outlet opening 94 from the first section 86 and an inlet to the second section 88. As shown in FIG. 4, the second section 88 of the tank 74 is provided with a molasses outlet opening 96 positioned in the lower right hand end of the end wall 82. Molasses heated by the preheater 12 to a temperature of about 140° F. to a less viscous condition is pumped through the conduit 72 and through the inlet opening 92 to flow through the first section 86 to the passage 94 between the first and second tank sections 86, 88 to the molasses outlet 96 as propelled by the pump 70. During this flow the molasses in the tank 74 is pumped to maintain the depth thereof at about eight to eighteen inches and is heated from an inlet temperature of about 140° F. to an outlet temperature of about 240° F. to cook the molasses to drive off by evaporation more than one-half of the water content thereof.

To agitate and aerate the molasses being cooked in the tank 74 while it is still in a relatively thick, viscous state, an air injection tube assembly 98, 100 is provided in the first and second tank sections 86 and 88. The air injection tube assembly 98 comprises serpentine conduits 102 and 104 positioned in the lower portions of the first and second tank sections 86 and 88, respectively, which are supported in the left and right end walls 80 and 82 immediately above the bottom wall 84 and is connected by a conduit 106 to any conventional source of ambient air under pressure such as an air blower or impellar 108 adapted to deliver approximately 25 to 50 cubic feet per minute to the tank 74. The serpentine conduits 102 and 104 each comprise a series of back and forth extending sections 110 and 112 connected at angular junctions or apexes 114. Of particular significance to one aspect of the present invention is the provision on the underside face of each apex 114 of an air injecting nozzle 116 shown in FIGS. 3 and 4, as totalling nine in number for each serpentine conduit 102 and 104 for directing ambient air downwardly towards the bottom wall 84, which air bubbles upwardly to agitate the molasses in the tank 74 to reduce hot spots therein and to break the surface tension of the molasses to aid in ejection of the water-content thereof to atmosphere. It has been found that without such means to reduce or break the surface tension of the molasses, steam tends to well-up beneath the surface thereby inducing undesirable expansion and foaming and retarding the removal of the water content thereof. If not otherwise corrected, such conditions would cause a less dense, less satisfactory final product.

To heat and cook the molasses in the tank 74, a source of heat exchange fluid of any conventional type, such as the steam generator assembly 60, is provided, as schematically indicated in FIG. 1 to direct a heat exchange medium such as steam to heat the molasses content of the tank 74 from about 140° F. to about 240° F. The steam generator 60 is connected by a conduit 118 to a heat exchanger assembly 120 positioned adjacent the bottom of the first tank section 86 spaced above the serpentine conduit 102. The heat exchange assembly 120 is shown comprising four longitudinal extending conduit runs 122, 124, 126 and 128 connected together by three lateral end runs 130, 132, 134, the heat exchanger assembly 120 being supported on the left and right end walls 80 and 82 of the tank 74 at a height extending upwardly from about two inches from the tank bottom 84. The first conduit run 122 is connected by the conduit 118 to the steam generator assembly 60 and the last conduit run 128 returns steam through a return conduit 136 to the steam generator assembly 60. A single run heat exchanger assembly 138 is provided for the second tank section 88 which is similar in function, position, and support to the heat exchanger assembly 120 but is relatively much larger in diameter. The heat exchanger assembly 138 comprises a longitudinally extending, single heat exchanger run or conduit 140 positioned in the second secton 88 of the tank 74 and connected to the steam inlet conduit 118 and a second return conduit 142 to the steam generator assembly 60. It is important that the periphery of the single large diameter conduit 140 extends to within about ¼ to ½ inch of the adjacent walls 76 and 90, substantially filling the width of the second section 88. It has been found that this arrangement wherein the heat exchanger conduit 140 is closely adjacent to the walls 76 and 90 substantially increases the heat transferred to the molasses flowing thereabout. Molasses introduced into the inlet 92 of the initial heater-cooker and aerator 14 is pumped by the pump 70 at a rate typically about 3 gallons per minute to maintain the depth of such molasses in the first and second tank sections 86 and 88 of the tank 74 at a depth of from about eight to eighteen inches. Such molasses flows about and along the two heat exchanger assemblies 120 and 138 to be cooked thereby removing about half of the water content thereof. Dwell time of molasses in the initial heater cooker-aerator 14 is about 20 to 30 minutes. Air is evenly injected throughout the molasses flow from below the level of heat exchanger assemblies 120 and 138 through the nozzles 116 in a downwardly direction to rise and bubble through the molasses and the surface thereof to thereby break the surface tension thereof. It has been found that by the injection of air in the manner disclosed, the molasses is not only agitated to aid in uniformly heating the same and thereby avoid hot spots therein but also that injected air rising to the surface of the molasses breaks the surface tension thereof, whereby evaporation and reduction of water content is substantially enhanced and accelerated, undesirable expansion and foaming is avoided, and a denser final product is achieved.

Figure 5:
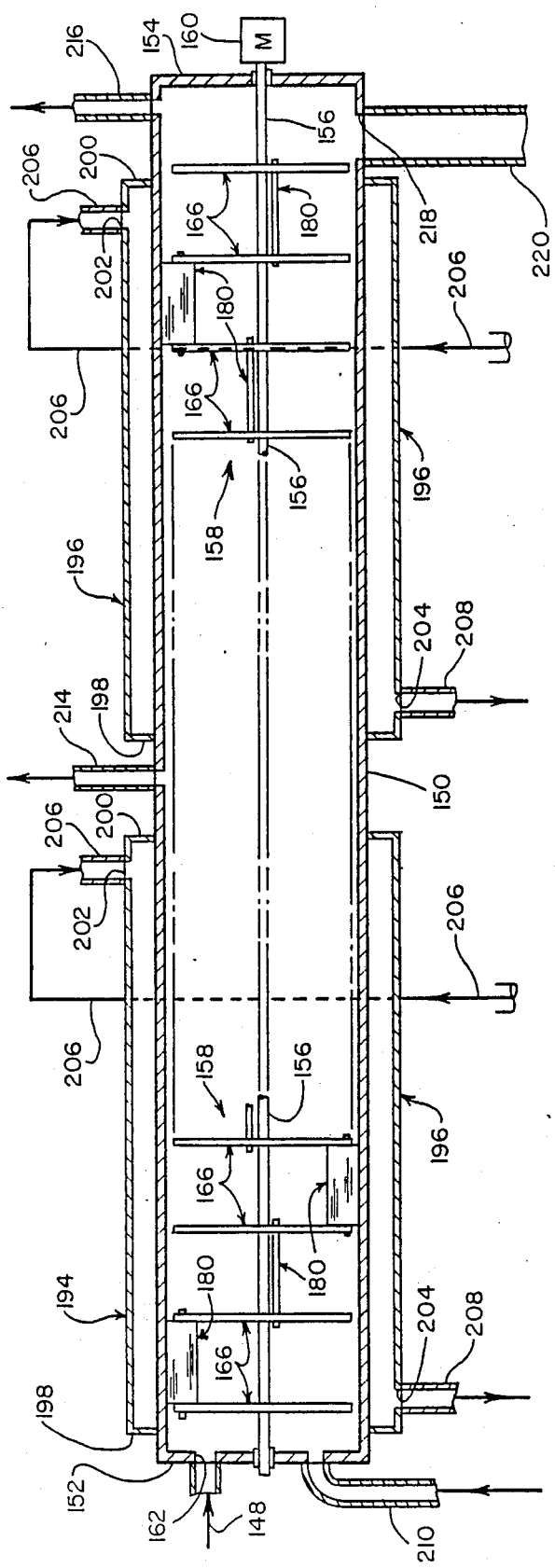
FIG. 5 is a schematic sectional view of a final cooker-evaporator utilized in the method diagramed in FIG. 1.

From the initial cooker-aerator 14 molasses is pumped upwardly at about 3 GPM by a liquid pump 144 through conduits 146 and 148 shown in FIGS. 1 and 1A to the final heater-cooker 16 of a tube and shell type shown is more detail in FIG. 5. It should be noted, as shown in FIG. 1A that the final heater-cooker 16 is positioned in the plant or building 13 in an upwardly inclined orientation and at an elevated position so that molasses pumped through the cooker 16 will thereafter flow by gravity to the remainder of the processing apparatus. The final cooker 16 comprises an upwardly inclined, cylindrical cooking housing or tube 150 having an cylindrical inner periphery 151 and is typically approximately ten inches in diameter and eighteen feet long. The longitudinal left and right ends of the tube 150 are closed by circular end plates 152 and 154 and a shaft 156 of a paddlewheel assembly 158 is rotatably mounted in the end plates 152 and 154 and driven by a external electric drive motor 160 for agitating the molasses pumped through the final cooker 16 by the pump 144. The left end plate 152 of the tube 150 is provided with a molasses inlet opening 162 connected to the conduit 148 for delivery of liquid molasses from the initial heater-cooker-aerator 14. The left end plate 152 is further provided with an air inlet opening 164 for purposes that will be subsequently discussed.

The paddlewheel assembly 158 further includes a plurality of circular disks 166 fixedly mounted, as by keys not shown, in spaced relation along the shaft 156. About fifteen disks 166 are provided. As shown in FIG. 5A, each disk 166 is provided with a slot 170 cut in the outer periphery 172 thereof, the slot 170 extending radially inwardly toward a circular opening 174 receiving the shaft 156. The fifteen disks are fixed on the shaft 156 so that the fifteen slots 170 thereof are angularly staggered about the periphery of the shaft 156 to make the molasses flow path through the tube 150 unevenly sinusoidal. Each slot 170 is defined by a pair of radially extending forward and rearward disk walls 176 and 178. To form the disk 166, and as best shown in FIG. 5B, a circular, planar disk blank is radially cut to provide the slot 170 and is twisted out of a planar or straight condition so that each of the forward and rearward walls 176, 178 are sprung away from each other so that when installed on the shaft 150 the outer end of the forward wall 176 is nearer the right hand end of the final heater-cooker 16 than is the outer end of the rearward wall 178 to thereby enlarge the clearance between the walls 176 and 178. This is important because molasses is conveyed through the enlarged slots 170 and the final heater-cooker 16 by pumping thereof by the pump 144 pumping against the weight of the molasses in the upwardly inclined tube 150, as shown in FIG. 1A. Each adjacent pair of disks 166 along with adjacent portions of the inner periphery of the housing 150 define a discrete heating and mixing chamber separated from adjacent chambers by disks 166 and connected by the slots 170. Positioned between each adjacent pair of disks 166 and pivotally mounted on the outer periphery thereof is a longitudinal extending scraper-mixing blade assembly 180. The blade assembly 180 comprises a rectangular blade 182 having a pair of offset, pivot pins 184 on the longitudinal ends of the blade 182, the pins 184 being offset to be closer to one flat longitudinal side 186 of the blade 182. The flat side 186 is adapted to follow the contour of the inner periphery 151 of the tube 150 to remove or scrape off any molasses adhering to the periphery 151. The pins 184 extend through aligned bores or holes 188 in an adjacent pair of disks 166. Four such holes 188 are spaced about the periphery of each disk 166 to permit angularly staggering the blade assemblies 180 of the fifteen disks 166 about the periphery of the shaft 156. Each pin 184 further includes a transverse bore 190 adjacent the free end thereof to receive a cotter pin 192, or the like, to longitudinally fix the blade assembly 180 relative to the disk 166. One blade assembly 180 is mounted in each adjacent pair of disks 166 so that the blade assemblies are staggered about the periphery of the shaft 156 to equalize the rotational load about the shaft 156. On rotation of the shaft 156, the blade assemblies 180 are rotated about the inner periphery 151 of the housing 150 and are free to pivot relative to the disks 166 so that the radially outward longitudinal side 186 of the blade assembly 180 scrapes against the inner periphery 151 of the housing 150 to thereby remove any molasses adhering to the inner periphery 151. Further, each blade assembly 180 functions as a mixing blade to mix the molasses in the chamber formed by the adjacent pair of disks 166.

To heat the final heater-cooker 16 and the molasses therein, as best seen in FIG. 5, a pair of longitudinally spaced annular shell assemblies 194, 196 each having left and right annular end closures 198, 200 and steam inlet and outlet openings 202 and 204 are provided for directing and returning a heat exchanger or transfer medium, such as steam through inlet and return steam conduits 206 and 208 from the steam generator assembly 60 about the periphery of the cooking tube 150 for heating and cooking molasses therein. An air conduit 210 for directing ambient air from an ambient air blower 212 (FIG. 1) to the air inlet opening (FIG. 5) is provided to assist in removal of moisture resulting from evaporation of the water content of the molasses being cooked through a pair of longitudinally spaced vents 214 and 216 positioned intermediate the length and at the right end of the cooker tube 150. The temperature of the molasses is raised from an inlet temperature of about 240° F. to an outlet temperature of about 260° F. to 285° F. Dwell time in the final cooker 16 is about 10 to 15 minutes. Water content of the molasses being cooked in the final cooker is reduced to preferably less than 5% of the molasses by evaporation and the molasses is pumped through the cooking tube 150 and the paddlewheel assembly 158 to a molasses outlet 218 in the lower periphery of the lower right hand end of the cooker tube 150 for directing the fully cooked molasses to a conduit 220 to fall by gravity to the molasses flail cooler and de-aerator 18.

The flail cooler and de-aerator assembly 18, as shown in FIGS. 6 and 7, comprises a downwardly inclined, steel flail housing, tube or receptacle 222 preferably ellipical or oval in cross-section, the major and minor axes 224 and 226 of the ellipse being typically approximately 26 inches and 16 inches, respectively. The tube is typically about 6 feet in length. The right and left longitudinal ends of the flail tube 222 are closed by right and left end plates 228 and 230 and the tube 222 is provided with molasses inlet and outlet openings 232 and 234. Because of the downwardly inclined orientation of the flail tube 222, the molasses outlet 234 is below the molasses inlet 232 so that gravity aids in movement of molasses through the device. A flail shaft assembly 236 is rotatably mounted in the right and left end plates 228 and 230 in an offset manner along the major axis 224 of the flail tube ellipse by about five inches relative to the central longitudinal axis 238 of the flail tube 222. The flail shaft assembly 236 comprises a longitudinal extending flail shaft 240 the right end of which is drivingly connected to an external electric drive motor 242 to rotate the same at about 1100 RPM. A plurality of tee-shaped beater or flail bars 244 are fixed at right angles in spaced relation along approximately the upper two-thirds of the length of the flail shaft 240 in perpendicular relationship thereto. Each beater bar 244 comprises a radially extending member 246 the inner end of which is fixed to the shaft 240 and the outer end of which is fixed, at a right angle, to a horizontally extending member 248 extending longitudinally of the flail shaft 240. The diameter of the flail shaft assembly 236 from the outboard edge of a horizontal member 248 of the beater bar 244 to an outboard edge of an oppositely disposed beater bar 244 is approximately 16 inches. With reference to FIG. 7, it is thus seen that substantial moon-shaped space 250 is present within the ellipical flail tube 222 beyond the rotational circle of the beater bars 244 of the flail shaft assembly 236 to facilitate movement of more cooling air therethrough than would be available in a cylindrical tube dimensioned to receive the flail shaft assembly 236. Molasses in the flail tube 222 is picked up by the horizontal members 248 from the bottom periphery of the flail tube 222 and thrown through the space 250 toward the upper periphery of the tube 222 to de-aerate the molasses. To rapidly cool the molasses being thrown about within the flail tube 222 the right end plate 228 of the flail tube 222 is provided with a cold air inlet 252 for directing cold air from a conduit 254 (FIG. 1) and a cold air compressor blower 256 which typically provides about 400 cubic feet per minute of cold air through the interior of the flail tube 222 to be vented to atmosphere at an air outlet opening and vent 257 and 258. Molasses in liquid form is directed through the molasses inlet 232 of the flail tube 222 to be tossed, beaten, stretched and thrown about by the beater bars 244 within the moon-shaped space 250 and rapidly cooled by the flow of cold air directed from the cold air blower 256. As molasses is tumbled through the flail tube 222, it is de-aerated and the temperature thereof is lowered from an inlet temperature of about 285° F. to an outlet temperature of about 180° F. to 200° F., from whence it is directed through the outlet 234 and a conduit 260 to fall by gravity to the mixer-auger 20. Dwell time for molasses in the flail cooler and de-aerator assembly 18 is approximately twenty to thirty seconds.

The mixer-auger 20, as shown in FIGS. 8 and 9, comprises an upwardly inclined mixer-auger cylindrical housing or tube 262 having right and left end plates 264 and 266 closing the longitudinal ends thereof. The housing 262 further includes a pair of inlet openings 268 and 270, for admitting the molasses from the conduit 260 from the flail-cooler and de-aerator 18 and for receiving other feed supplement ingredients such as plant protein, roughage, fat, urea, vitamins, salt, other minerals and/or pharmaceuticals or the like, delivered by a conduit 272 and a conventional screw or auger conveyor 274 and metered from a conventional supplement hopper or storage bin 21 (FIGS. 1 and 1A). The housing 262 further includes an outlet opening 276 for directing the materials mixed by the mixer auger 20 for further processing. The housing 262 is upwardly inclined so that the housing 286 adjacent the outlet opening 276 is elevated relative to the housing adjacent the inlet openings 268 and 270. Rotatably mounted in the end plates 264 and 266 of the housing 262 is an auger assembly 278 including an auger shaft 280 which is rotatably driven by an electric driven motor 281. As best seen in FIG. 9, positioned in fixed spaced relation about the periphery of the auger shaft 280 by a plurality of spokes 282 is an abbreviated or ribbon screw conveyor 284 comprising a helically shaped ribbon 286 of variable pitch coiled about a central cylindrical channel or space 290 between the coils of the ribbon 286. By pitch is meant the longitudinal distance, as along the shaft 280, between the longitudinal ends of the helical ribbon 286 defining one complete ribbon revolution about the periphery of the shaft 280. For each revolution of the shaft 280, material being conveyed is advanced by the ribbon 286 a discrete distance along the longitudinal axis of the shaft 280. At the right end of the shaft 280, as suggested in FIG. 8, one revolution of the shaft 280 results in forward movement of the material a distance approximately equal to the diameter of the helical ribbon 286. However, adjacent the left end of the shaft 280, as shown in FIG. 8, one revolution of the shaft 280 results in forward movement of the material a distance approximately equal to one-fourth of the diameter of the helical ribbon 286. The pitch of the helical ribbon 286 is evenly graduated from right to left along the length thereof. Consequently, the material at the right end of the shaft 280 tends to move more quickly than the material near the left end of the shaft 280 and therefore the material on the right tends to urge forwardly, the material of the left. It should be understood that, as the material entering the housing 262 adjacent the right end of the shaft 280 is conveyed against the upward incline of the housing 262, a portion of the material being moved adjacent the left of the shaft 280 tends to fall backwardly in the central channel 290 to be picked-up again by the ribbon 286 and be advanced with material from the right. By this advancing, falling back and advancing again action, the material becomes more uniformly mixed. Other supplement ingredients are metered at a controlled rate from a supplement storage hopper 21 to be uniformly mixed with in appropriate proportions with the molasses delivered to the mixer-auger tube 262. The mixture of molasses combined with other supplements is directed by gravity through an outlet opening 276 and a conduit 292 to the cooling tower 22 for further cooling thereof.

The cooling tower 22 is of any generally conventional construction and may include a rotatable distributor 294 on the upper end thereof to disperse materials directed by the conduit 292 to an inlet in the upper end of the cooling tower 22 and about the periphery thereof to fall by gravity and to be cooled by cold air directed from a conventional cold air blower 296 to cool the mixture to about 140°-150° F. Such material is directed through the cooling tower outlet 298 to a conventional conveyor 24 for delivery of the mixture to a containerizing station 26. Depending upon ambient conditions, utilization of the cooling tower 22 or equivalent cooling device, may or may not be necessary to reduce the mixture temperature as desired. Material having a temperature of 150° F. or less is currently preferably deposited in masses of about 250 pounds in 55 gallon steel drums 299 cut in half and further transported on a wheeled trolley 300 but any suitable relatively rigid container may be used in sizes of up to 500 pounds or more. After containerization the masses or blocks are allowed to cool to ambient temperature and cure and harden to a vitreous form.

While the invention has been described with a certain degree of particularity, it is manifest that many changes may be made in the details of the process, or the construction and the arrangement of the components or machinery therefor. For example, a composition of pure molasses or one of molasses mixed with certain other ingredients, such as fat or other feed supplements may be directed to the initial heater-cooker-aerator 14. It is understood that the invention is not to be limited to a specific embodiment of the apparatus set forth herein by way of exemplifying the invention but that the invention is to be limited only by the scope of the attached claims including a full range of equivalency to which each element or the apparatus or step of the process is entitled.

What is claimed is:

1. In a heater for heating a molasses composition and removing at least a portion of the water content of the molasses, the heater comprising a receptacle for receiving the molasses composition to be heated; and heater means operatively related to said receptacle for heating the molasses composition in the receptacle at least a portion of the water content of the molasses; the improvement comprising
    (a) air injecting means for injecting air into the molasses composition to agitate said molasses composition during heating and to reduce the surface tension of said molasses composition;
    (b) said receptacle further including a longitudinally extending open tank through which the molasses composition is adapted to be moved, said open tank having an upper end open to the atmosphere and a bottom wall, said air injection means further comprising a plurality of air outlets adjacent said bottom wall of said open tank for injecting air into the molasses composition throughout the movement thereof through said open tank, said open tank including first and second end walls connected with said bottom wall, a molasses composition inlet and outlet adjacent the connection of said first end wall and said bottom wall, a longitudinally extending tank partition fixed to said bottom wall and said first end wall between said inlet and said outlet and extending from said first end wall of said tank to a point adjacent to but spaced from said second end wall of said tank to divide said tank into first and second tank sections in fluid communication with each other through the space between said partition and said second end wall, said heater means and said air injection means being operative in both said first and second tank sections.

2. Apparatus as defined in claim 1, and further including cooler and de-aerator means connected with said heater for cooling and de-aerating the heated and air-injected molasses, said cooler and de-aerator means including a housing connected with said heater for receiving the molasses composition to be cooled and de-aerated, agitator means positioned in said housing for separating portions of the molasses composition from the remainder thereof to de-aerate the same, and cooling means for cooling said portions while separated from said remainder.

3. The cooler and de-aerator according to claim 2 wherein said receptacle comprises a closed, generally cylindrical conduit having a longitudinal axis, said agitator means including an agitator shaft rotatably mounted in said conduit, said agitator shaft having a longitudinal axis spaced from and offset relative to said longitudinal axis of said conduit, and a plurality of radially projecting beater elements fixed in longitudinally spaced relation along said agitator shaft for separating said portions from said remainder and means to rotate said shaft.

4. The cooler and de-aerator according to claim 3 wherein said conduit has a molasses composition inlet adjacent one longitudinal end of said conduit and a molasses composition outlet adjacent the other longitudinal end thereof, said one longitudinal end being vertically elevated above said other longitudinal end.

5. The cooler and de-aerator according to claim 3 wherein said generally cylindrical conduit is ellipical in cross-section including having major and minor axes, said agitator shaft being rotatably mounted in said conduit adjacent one end of said major axis.

6. The cooler and de-aerator according to claim 2 wherein said cooling means includes means for directing cold air through said conduit substantially from one end thereof to the other.

7. Apparatus as defined in claim 2, and further including auger-mixer means connected with said cooler and de-aerator means for conveying and mixing the cooled and de-aerated molasses, including:
(a) a longitudinally extending cylindrical housing having at least one material inlet adjacent one longitudinal end thereof and a material outlet adjacent the other longitudinal end of said housing;
(b) a conveyor shaft rotatably positioned in said housing and extending at least between said inlet and outlet and drive means for rotating said shaft; and
(c) a helical ribbon including a plurality of coils fixed in spaced relation to and supported about said shaft for moving material from said inlet to said outlet, said ribbon defining a central, longitudinally extending, cylindrical space between transversely opposed portions of said ribbon wherein a portion of the material being conveyed toward said outlet by the helical ribbon is adapted to fall into said space and backwardly toward said inlet and be reconveyed toward said outlet to aid mixing the material being conveyed.

8. The auger-mixer of claim 7 wherein said housing is vertically elevated adjacent said outlet relative to adjacent said inlet and wherein said coils of helical ribbon have a first pitch adjacent said inlet and a second pitch adjacent said outlet, said second pitch being substantially less than said first pitch.

9. The auger-mixer of claim 8 wherein said second pitch is abput one-quarter of said first pitch.

10. The auger-mixer of claim 9 wherein the pitch of said helical ribbon is evenly graduated along the length of said shaft from said first pitch to said second pitch.

11. The auger-mixer of claim 10 wherein said housing inlcudes a second inlet adjacent said one end, said inlets adapted to direct molasses composition and other feed supplements, respectively, into said housing for mixing the same.

12. Apparatus as defined in claim 1, and further including second-stage heater means, comprising a generally closed longitudinally extending, cylindrical housing, said housing having an inner periphery and a composition inlet and outlet adjacent opposite ends of said housing, a longitudinally extending shaft rotatably mounted in said housing, drive means for rotating said shaft, heater means for heating fluid composition within said housing, a plurality of disks fixedly connected to and spaced along said shaft, each of said disks having an outer periphery extending radially to adjacent said inner periphery of said housing and having a opening in said disk, a longitudinally extending blade pivotally mounted on and between adjacent pairs of said disks, adjacent pairs of disks with adjacent portions of said housing defining discrete heating chambers, said blades being staggered about the periphery of said shaft, and pump means for pumping the fluid composition from said inlet, through said opening in each of said disks, and through each of said chambers to said outlet while said blades agitate the fluid composition in each of said chambers.

13. The heater according to claim 12 wherein housing further includes air inlet means adjacent one end of said housing for directing air through said housing and air vent means spaced from said air inlet means for venting said air to the atmosphere.

14. The heater according to claim 13 wherein each opening in said disks comprises a slot extending through said outer periphery of said disk, said slot extending radially inwardly toward said shaft, and defined by a pair of radially extending disk walls on opposite sides of said slot, each of said disk walls having a radially outer end adjacent said slot, the outer end of one of said disk walls on one longitudinal side of disk being closer to the housing outlet than the outer end of the other of said disk walls on the other longitudinal side of said slot.

15. The heater according to claim 14 wherein each in said blades have a radial outer periphery, the outer periphery of each of said blades extending radially outwardly of said outer periphery of the adjacent pair of said disks.

16. The heater according to claim 12 wherein said housing is elevated adjacent said outlet relative to said housing adjacent said inlet.

17. In a plant for mixing liquid molasses with other animal feeds, the plant including heater and air-injecting means for heating the molasses and for injecting air therein, storage means for storing the molasses prior to heating, and first longitudinally extending conduit means connected to said storage means and said heater means for directing molasses from said storage means to said heating means for heating the molasses;

the improvement comprising molasses pre-heater means for heating the molasses from the storage means prior to delivery to said heater means, said pre-heater means comprising second longitudinally extending conduit means for carrying a heat transfer medium for heating the molasses, said second conduit means positioned internally of said first conduit means for heating the molasses in the first conduit means.

18. In the plant according to claim 17 wherein said heater means is housed in a plant building and said storage means is remote from said building and supported on a ground surface, at least a portion of said first conduit means having said second conduit means internally thereof being buried in the ground below said ground surface between said storage means and said building.

19. In the plant according to claim 18 wherein said storage means comprises a liquid holding tank, said tank including a liquid outlet adjacent the lower end thereof connected to said first conduit means and liquid outlet heater means for heating molasses to be drawn from said tank, said liquid outlet heater means being positioned in said tank and about said tank liquid outlet for heating molasses flowing through said outlet into said first conduit means.

20. An apparatus for making molasses-based animal feed supplement masses comprised of molasses and other animal feed supplements, said apparatus comprising:

molasses storage means for storing liquid molasses, said storage means including a molasses outlet;

preheater means for heating the molasses, said preheater means comprising an elongated first conduit in fluid communication with and for conveying molasses from said molasses storage means outlet, said preheater means further including a elongated second conduit for conveying a heat transfer medium, said second conduit extending longitudinally and internally of said first conduit, and means for heating said heat transfer medium in fluid communication with said second conduit;

a molasses heater-aerator for further heating and aerating molasses, said heater-aerator including a molasses receptacle having a molasses inlet and outlet, said molasses inlet being in fluid communication with said first conduit, said heater-aerator further including heater means for heating molasses in said molasses receptacle and aerator means for injecting air into the molasses while the molasses is being heat in said receptacle;

a second molasses heater for further heating the molasses, said second heater comprising a housing having a molasses inlet and outlet, said molasses inlet in said housing in fluid communication with said molasses outlet of said receptacle of said heater-aerator, said second heater further comprising second heating means for heating molasses in said housing, agitating means for agitating molasses being heated in said housing, air circulating means for circulating air through said housing, and drive means for driving said agitating means;

molasses pump means for pumping molasses from said first conduit of said preheater, through said heater-aerator and through said second heater to said outlet of said housing;

a molasses cooler and de-aerator for cooling and de-aerating the molasses, said cooler and de-aerator including a cooler housing, said cooler housing having a molasses inlet and outlet, said molasses inlet of said cooler housing in fluid communication with said molasses outlet of said second heater housing, said cooler and de-aerator further including second agitating means positioned in said cooled housing for separating portions of the molasses in said cooler housing from the remainder of the molasses in said cooler housing to de-aerate the molasses cooling means to cool said portions while separated from said remainder, drive means for driving said second agitating means;

a mixer for mixing molasses with other feed supplements, said mixer including a mixer housing having a first inlet in fluid communication with said cooler housing outlet, a second inlet for directing other feed supplements to said mixer housing, and a mixture outlet for egress of molasses mixed with the other feed supplements, said mixer further including a screw-type auger rotatably positioned in said mixer housing, said screw-type auger including a helical ribbon of variable pitch for mixing the molasses and the other feed supplements and conveying the mixture from said mixer housing inlets to said mixer housing outlet, drive means for rotating said screw-type auger; and conveying means for conveying said mixture from said mixer housing outlet to a mixture containerizing station for placing the mixture in containers and forming the masses of molasses-based animal feed supplements.

21. The apparatus for making molasses-based animal feed supplement masses of claim 20 wherein:

the said molasses heater-aerator comprises a longitudinally extending open tank through which the molasses composition is adapted to be moved, said open tank having an upper end open to the atmosphere and a bottom wall, said aerator means further comprising a plurality of air outlets adjacent said bottom wall of said open tank for injecting air into the molasses composition throughout the movement thereof through said open tank;

the second molasses heater agitating means comprises a longitudinally extending shaft rotatably mounted in said housing, a plurality of discs fixedly connected to and spaced along said shaft, each of said discs having an outer periphery extending radially to adjacent said inner periphery of said housing and having an opening in said disk, a longitudinally extending blade pivotally mounted on and between adjacent pairs of said disks, said adjacent pairs of disks with adjacent portions of said housing defining discrete heating chambers; and the said cooler and de-aerator cooling means includes means for directing air through said cooler housing substantially from one end thereof to the other.

22. In a heater for heating a molasses composition and removing at least a portion of the water content of the molasses, the heater comprising a receptacle for receiving molasses to be heated, said receptacle including longitudinally extending, transversely spaced, opposed walls for channeling the flow of the molasses therethrough, and a heater means including heat transfer medium conduit means positioned in said receptacle between said opposed walls; the improvement:

(a) wherein said heater transfer medium conduit means includes a single conduit having a diameter substantially filling the transverse distance between said opposed walls;
(b) and further including air injection means for injecting air into the molasses while it is being heated by said heater;
(c) said receptacle including first and second longitudinally extending receptacle sections in fluid communication with each other, each of said sections having longitudinally extending, transversely spaced, opposed walls, said heat transfer medium conduit means further comprising a plurality of connected conduits positioned in said first receptacle section and said single conduit being positioned in said second receptacle section and substantially filling the space between the opposed walls thereof.

23. In the heater according to claim 22, wherein said first and second receptacle sections are in longitudinally extending side-by-side relation.

24. In the heater according to claim 22, wherein said receptacle further includes molasses composition inlet means in said first receptable section and molasses composition outlet means in said second receptacle section.

* * * * *